(12) United States Patent
McFadden et al.

(10) Patent No.: US 9,269,143 B2
(45) Date of Patent: Feb. 23, 2016

(54) CAMERA ON A ROVER SURVEYING SYSTEM

(71) Applicant: TRIMBLE NAVIGATION LIMITED, Sunnyvale, CA (US)

(72) Inventors: Chad McFadden, Broomfield, CO (US); Geoffrey Kirk, Broomfield, CO (US); John Cameron, Los Altos, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 10 days.

(21) Appl. No.: 14/328,267

(22) Filed: Jul. 10, 2014

(65) Prior Publication Data
US 2016/0012590 A1 Jan. 14, 2016

(51) Int. Cl.
G06K 9/00 (2006.01)
G06T 7/00 (2006.01)
G01V 8/00 (2006.01)
G06T 17/05 (2011.01)
G01C 15/00 (2006.01)

(52) U.S. Cl.
CPC ............ *G06T 7/0022* (2013.01); *G01C 15/002* (2013.01); *G01V 8/00* (2013.01); *G06T 7/004* (2013.01); *G06T 17/05* (2013.01); *G06T 2207/10012* (2013.01); *G06T 2207/10028* (2013.01)

(58) Field of Classification Search
CPC combination set(s) only.
See application file for complete search history.

(56) References Cited

U.S. PATENT DOCUMENTS

| | | | |
|---|---|---|---|
| 5,255,441 A | 10/1993 | Burgess et al. | |
| 5,319,707 A * | 6/1994 | Wasilewski | H04N 7/1675 348/473 |
| 5,473,368 A * | 12/1995 | Hart | G08B 13/1963 348/155 |
| 6,590,640 B1 * | 7/2003 | Aiken | G01C 15/002 356/3.01 |
| 6,681,174 B1 * | 1/2004 | Harvey | G08G 1/127 340/433 |
| 6,688,012 B1 | 2/2004 | Crain et al. | |
| 7,669,341 B1 | 3/2010 | Carazo | |
| 8,147,503 B2 * | 4/2012 | Zhao | A61B 19/2203 382/128 |
| 8,346,392 B2 * | 1/2013 | Walser | B25J 9/1697 700/259 |
| 8,769,838 B2 * | 7/2014 | Ward | G01C 15/06 33/293 |
| 2008/0154127 A1 * | 6/2008 | DiSilvestro | A61B 19/5244 600/427 |
| 2010/0215220 A1 * | 8/2010 | Yamaguchi | G06K 9/00791 382/106 |
| 2013/0053063 A1 * | 2/2013 | McSheffrey | G08B 7/066 455/456.1 |

OTHER PUBLICATIONS

International Search Report for Application No. PCT/US2015/039199, mailed Dec. 12, 2015, 7 pages.
Written Opinion for Application No. PCT/US2015/039199, mailed Dec. 12, 2015, 10 pages.

* cited by examiner

*Primary Examiner* — Anand Bhatnagar
(74) *Attorney, Agent, or Firm* — Kilpatrick Townsend & Stockton LLP (57) ABSTRACT

A surveying system comprising a station and rover is used to make field measurements of a job site. The station at a first location has one or more cameras and one or more targets. The rover has one or more cameras and one or more targets. The rover is moved to a plurality of locations and images are acquired of the one or more targets of the station and/or the rover. The images are used to determine a spatial relationship between the first location and the plurality of locations.

20 Claims, 10 Drawing Sheets

CAMERA ON A ROVER SURVEYING SYSTEM

BACKGROUND

This disclosure relates in general to surveying systems and, but not by way of limitation, to determining spatial relationships between different locations. Surveying allows plots of lands to be accurately measured. It is common for a plot of land to be surveyed before the plot of land is developed and/or modified.

BRIEF SUMMARY

In some embodiments, a surveying system and method for making field measurement uses a station, a rover, and a transmitter. The station is configured to be placed at a first location and comprises a first camera, a second camera, and a first target. The rover is configured to be placed at a plurality of locations, the plurality of locations including a second location. The rover comprises a third camera, a fourth camera, and a second target. Images of the first and second target are acquired by using cameras. A transmitter wirelessly transmits the images to a receiving unit for processing. By processing target locations in the images (i.e., two-dimensional images), a three-dimensional spatial relationship between the first location and the second location is determined.

In some embodiments, a surveying system comprises a station, a rover, and a transmitter. The station is configured to be placed at a first location and the station comprises a first camera, a second camera at a first known distance from the first camera, and a first target. The rover is configured to be placed at a second location and comprises a third camera, a fourth camera at a second known distance from the third camera, and a second target. The transmitter is configured to wirelessly transmit images acquired by the first camera and the second camera to a receiving unit. In some embodiments, the receiving unit comprises one or more processors and a memory device having instructions to identify a first image, the first image being acquired by the first camera while the station is at the first location; determine a first position of the second target in the first image; identify a second image, the second image being acquired by the second camera while the station is at the first location; determine a second position of the second target in the second image; identify a third image, the third image being acquired by the third camera while the rover is at the second location; determine a first position of the first target in the third image; identify a fourth image, the fourth image being acquired by the fourth camera while the rover is at the second location; and determine a second position of the first target in the fourth image. In some embodiments, the rover has a similar number of targets and/or cameras as the station.

In some embodiments, a surveying system for making field measurements comprises a station, a rover, a first target, a first camera, and one or more processors. The station is at a first location. The rover is configured to be moved to a plurality of locations, while the station is not moved. The first target is coupled with either the rover or the station. The first camera is coupled with either the rover or the station. The first camera acquires one or more images of the target while the rover is at each of the plurality of locations. The one or more processors apply baseline data to generate calibration data. The baseline data includes a first known distance between the first location and a second location, the second location being part of the plurality of locations. The one or more processors calculate a spatial relationship between the first location and the second location based on locations of the target in the images.

In some embodiments, a method for making field measurements is disclosed. A station is placed at a first location, the station comprises a first camera, a second camera, and a first target. The first camera is separated from the second camera by a first known distance. A rover is placed at a second location, the rover comprises a third camera, a fourth camera, and a second target. The third camera is separated from the fourth camera by a second known distance. A first image is acquired with the first camera; a second image is acquired with the second camera; a third image is acquired with the third camera; and a fourth image is acquired with the fourth camera. A spatial relationship between the first location and the second location is determined based on a position of the second target in the first image; a position of the second target in the second image; a position of the first target in the third image; a position of the first target in the fourth image; the first known distance; and the second known distance.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
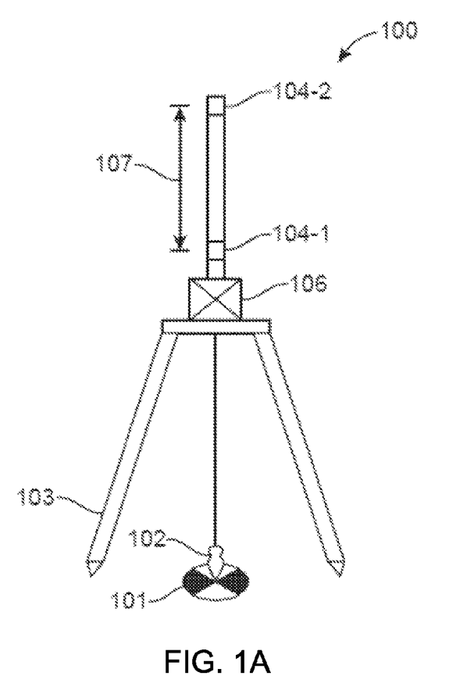
FIG. 1A depicts an embodiment of a station for use in land surveying.

In FIG. 1A, an embodiment of a station 100 for use in land surveying is shown. The station 100 comprises a plumb bob 102, a tripod 103, a first target 104-1, a second target 104-2, and a prism 106. The plumb bob 102 is attached to the tripod 103, so that the tripod 103 can be placed accurately over a reference mark 101 using the plumb bob 102. Examples of a reference mark 101 include a geodetic marker or a control point at a job site. In some embodiments, instead of a plumb bob 102, an optical plummet (e.g., laser plummet) could be used.

The first target 104-1 and the second target 104-2 are positioned on a vertical post and separated by a known distance between targets 107. The vertical post and the prism 106 are mounted on the tripod 103. In some embodiments, the known distance between targets 107 is used to help calibrate or scale survey measurements. The prism 106 is a passive reflector. In some embodiments the targets 104 are active targets (e.g., light emitting diodes (LEDs)). In some embodiments, the targets 104 are passive. For example, a target 104 can be a retro reflector, such as a prism 106. In some embodiments, a target 104 comprises a pattern (such as a solid color, multiple colors, and/or a symbol). In some embodiments, the target 104 is integrated with the vertical post such as a sticker or paint on the vertical post. In some embodiments, a symbol with high contrast markings is used (e.g., black and white or white and florescent orange). In some embodiments, the prism 106 is used as a retro reflector for electronic distance meters (EDMs).

In some embodiments, the station further comprises a battery or other power source. In different embodiments different combination of targets can be used. For example, in some embodiments the first target 104-1 is passive and the second target 104-2 is active; the first target 104-1 is passive and the second target 104-2 is passive; one target 104 (passive and/or active) and the prism 106 are used; the prism 106 without a target 104 is used; or both the first target 104-1 and the second target 104-2 are both active and passive (e.g., an LED embedded at a location where the vertical rod is painted red and/or a sticker placed over the LED having an opening for the LED).

Figure 1B:
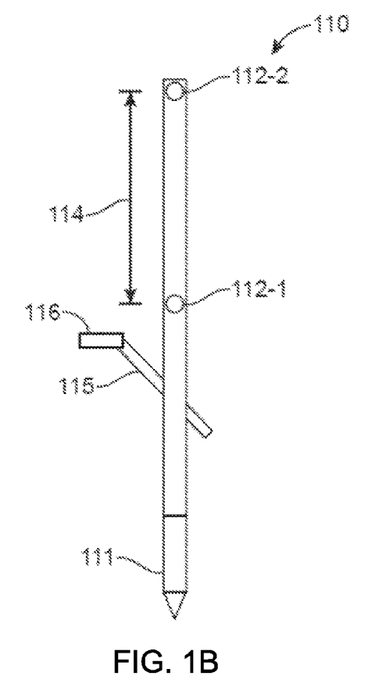
FIG. 1B depicts an embodiment of a rover for use in land surveying.

In FIG. 1B an embodiment of a rover 110 for use in land surveying is shown. The rover 110 is shaped like a surveying pole. The rover 110 comprises a power source 111, a first camera 112-1, a second camera 112-2, a data collector 115, and an EDM 116. In some embodiments, the power source 111 is internal (e.g., batteries). The first camera 112-1 and the second camera 112-2 are separated by a known distance between cameras 114. Having cameras 112 separated by the known distance between cameras 114 enables photogrammetric measurements to be made. In this embodiment, the known distance between cameras 114 is a vertical distance, which may make the rover 110 more convenient to move around a job site than having cameras separated by a horizontal distance. But the cameras 112 could be separated by a horizontal or other orientation. Additionally, the cameras 112 can be single shot, video, and/or panoramic. Single-shot cameras may be more economical, but in some embodiments accuracy of surveying may depend on a user correctly orienting the single-shot camera. Panoramic cameras often cost more but can find targets 104 without aiming. The cameras 112 are for acquiring images of the targets 104 and/or prism 106 of the station 100.

The data collector 115 is mounted on the rover 110. The cameras 112 are connected to the data collector 115 wirelessly (e.g., WiFi and/or Bluetooth) and/or wired (e.g., data cable). Additionally, in some embodiments the rover 110 receives information (e.g., images) from the station 100. In some embodiments, the data collector 115 is removed from the rover 110 (e.g., and part of a smart phone, iPad, tablet, laptop, or at the station 100). In some embodiments, image processing capabilities are contained inside and/or attached to the rover 110 (e.g., near or part of the data collector 115). In some embodiments, the data collector 115 comprises one or more displays for showing a view of either or both the cameras 112. Additionally, in some embodiments the data collector 115 comprises a compass (e.g., digital compass), inertial sensors, electronic tilt sensor(s), and/or bubble level(s) to facilitate in leveling and/or positioning the rover 110. In some embodiments, the rover 110 is meant to be kept vertical. In some embodiments, a tilt of the rover 110 is measured, and the tilt is used when calculating distances from the rover to the station. In some embodiments, the rover 110 comprises a temperature sensor (e.g., as part of the data collector 115 or independent of the data collector 115 to collect temperature data). Different temperatures can cause the distance between cameras 114 to fluctuate. The temperature sensor is used to make temperature measurements for calculations to account for a coefficient of expansion of the rover 110. Different ambient or systematic temperatures can be accounted for in photogrammetric position calculations using temperatures from the temperature sensor. In some embodiments, temperature data is initially acquired within a predetermined time from when images are taken by cameras. For example, temperature data is initially acquired within 15 minutes, 30 minutes, one hour, two hours, or four hours from when an image is taken.

In some embodiments, the EDM 116 is also used to improve positioning capability of the rover 110 and the station 100. In some embodiments, an EDM 116 uses a modulated microwave or infrared signal that is reflected by the prism 106, target 104, or other part of the station 100 to calculate a distance between the rover 110 and the station 100.

Figure 2A:
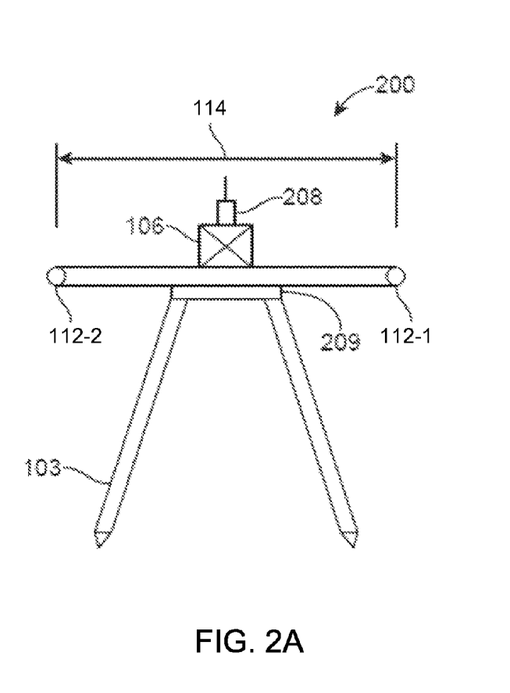
FIG. 2A depicts another embodiment of a station for use in land surveying.

In FIG. 2A another embodiment of a station 200 for use in land surveying is shown. The station 200 in this embodiment comprises a first camera 112-1 and a second camera 112-2 instead of the rover 110 in FIG. 1B comprising cameras 112. The cameras 112 are spaced by a known distance between the cameras 114 to facilitate photogrammetric calculations. The station 200 comprises a tripod 103 with a rotatable table 209. The rotatable table 209 can be free spinning and/or motorized. The rotatable table 209 facilitates setup and/or tracking. The station 200 further comprises a prism 106 and a wireless communication device 208. The wireless communication device 208 (e.g., radio or optical) enables communication between the station 200 and a rover and/or a third device (such as a mobile phone or tablet). The cameras 112 of station 200 are separated horizontally. It should be appreciated that in some embodiments, the cameras 112 are separated vertically.

Figure 2B:
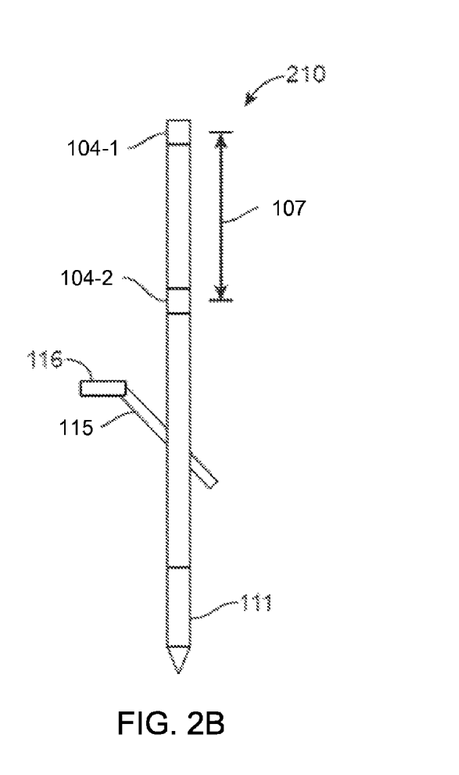
FIG. 2B depicts another embodiment of a rover for use in land surveying.

In FIG. 2B another embodiment of a rover 210 for use in land surveying is shown. The rover 210 comprises a power source 111, a first target 104-1, and a second target 104-2. The first target 104-1 is separated from the second target 104-2 by a known distance between targets 107. The rover 210 comprises a data collector 115, an EDM 116, and an antenna (or other wireless communication capability such as an IR sensor).

In some embodiments, The rover 210 in FIG. 2B is lower cost than the rover 110 in FIG. 1B (e.g., targets 104 are normally less expensive than cameras 112). Further, having cameras 112 at a station (e.g., station 200 in FIG. 2A) instead of on a rover (e.g., rover 110 in FIG. 1B) would likely have less jitter and vibration, which can be a benefit when performing photogrammetry calculation.

Active targets sometimes have an advantage over passive targets at night or in dusty conditions. In some embodiments, the targets 104 are visible from 360 degrees. In some embodiments, the targets 104 are active targets (e.g., light-emitting diode (LED)) and blink at a specified rate or at a specified sequence. Active targets that blink can aid in identification at a job site that has several systems with several targets 104. Active targets that blink can also aid in resisting spoofing. Thus in some embodiments, multiple stations and/or rovers can be used on a single job site (e.g., to increase a size of a job site being measured so that one station at one reference point does not have to be moved and set up at another reference point). Further, in some cases, photogrammetry works better over limited ranges, so having more than one station (e.g., each with targets 104 having an identifiable color, blink rate, and/or modulation) can allow a single surveyor to move around a site more conveniently. Additionally, in some embodiments multiple stations allow a surveyor to work around obstructions more easily.

Figure 3A:
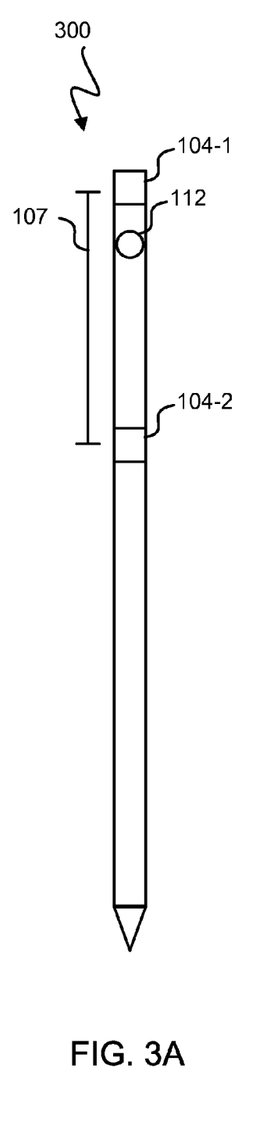
FIGS. 3A-3C depict further embodiments of a rover for use in land surveying.
Figure 3B:
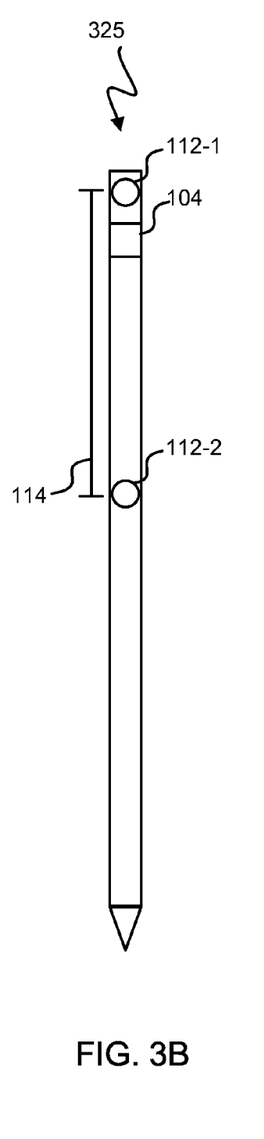
Figure 3C:
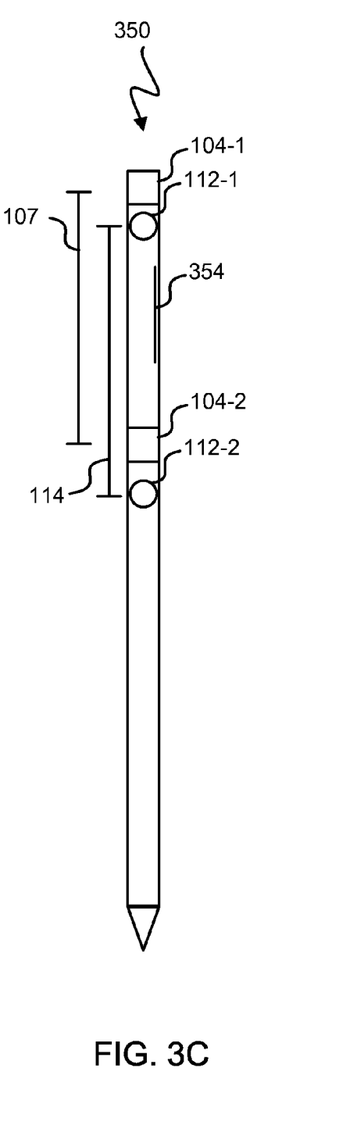

In FIGS. 3A-3C further embodiments of a rover for use in land surveying are shown. In some embodiments, these rovers can also be used as stations. In FIG. 3A, a rover 300 is shown having a camera 112, a first target 104-1, and a second target 104-2. The first target 104-1 and the second target 104-2 are separated by a known distance between targets 107.

In FIG. 3B, a rover 325 is shown having a target 104, a first camera 112-1, and a second camera 112-2. The first camera 112-1 and the second camera 112-2 are separated by a known distance between cameras 114. Using the known distance between cameras 114, photogrammetric measurements can be made.

In FIG. 3C, a rover 350 is shown having a first target 104-1, a second target 104-2, a first camera 112-1, and a second camera 112-2. The first target 104-1 and the second target 104-2 are separated by a known distance between targets 107. The first camera 112-1 and the second camera 112-2 are separated by a known distance between cameras 114. The rover 350 in FIG. 3C further comprises an antenna 354. The antenna 354 is used to transmit and/or receive data (e.g., images, temperature, GPS coordinates, etc.). In some embodiments, the antenna 354 transmits images to a data collector (e.g., smart phone such as an Android or iPhone) via Bluetooth. In some embodiments, the antenna 354 receives images and/or commands from a base station and/or commands from the data collector (e.g., a command to take a picture). For systems comprising a station and a rover, in some embodiments both the station and the rover wirelessly transmit images to the data collector and/or receive commands from the data collector. For systems comprising a station and a rover, in some embodiments the station wirelessly transmits and receives from the data collector; and the station wirelessly transmits and receives from the rover. Thus the data collector does not receive transmitted images directly from the rover. In some embodiments, the station and/or rover have one or more memory devices to store images and/or other data. In some embodiments, the station and/or rover wirelessly transmit images and/or data to the data collector while surveying is being performed. Thus processing can be done concurrently with surveying, and decisions (e.g., about whether or not to take more images and/or what target spots to survey) can be made while surveyors are in the field.

In some embodiments, a rover is also used as a station. For example, two similar rovers to the rover 325 in FIG. 3B are used to survey a job site. One of the two similar rovers is used as a station. In some embodiments, if a rover is to be used as a station, a base (e.g., a tripod 103) is used to stabilize and/or secure the rover. Thus a station and a rover can have a similar number of cameras 112 and/or targets 104. In another example, the station has one camera and the rover has two targets. In another example, the rover 300 in FIG. 3A is used as a station with rover 210 in FIG. 2B. Thus many permutations of cameras, targets, and other devices (e.g., EDMs 116, GPS, wireless communication, processors, memory, etc.) can be used.

Figure 4:
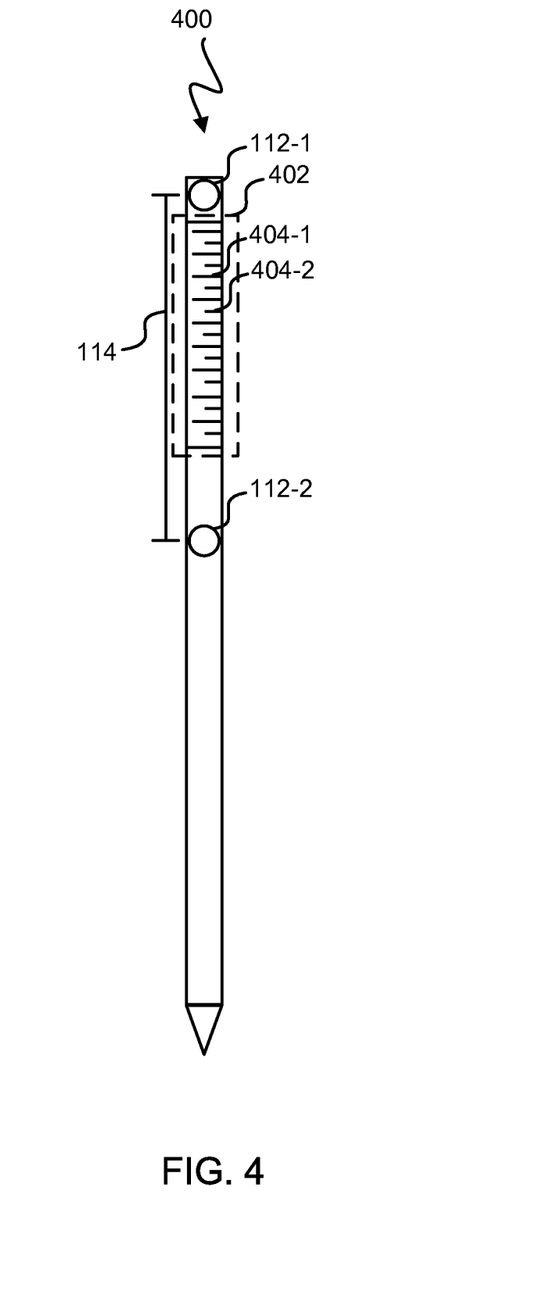
FIG. 4 depicts an additional embodiment of a rover for use in land surveying.

In FIG. 4, an additional embodiment of a rover and/or a station for use in land surveying is shown. In FIG. 4, a rover 400 is shown having first camera 112-1, a second camera 112-2, and a graduated ruler 402. The first camera 112-1 and the second camera 112-2 are separated by a known distance between cameras 114. The graduated ruler 402 is an example of target 104 that is passive. The graduated ruler 402 has a plurality of marks 404. A first mark 404-1 is an example of a major mark. A second mark 404-2 is an example of a minor mark.

FIGS. 3A-3C and FIG. 4 provide examples of embodiments where a rover could also perform functions of a station. For example, a survey system could comprise two copies of the rover 350 in FIG. 3C. One rover would be used as a station and the second rover is moved to a plurality of locations (i.e., target spots). In some embodiments, the plurality of locations is greater than 5, 10, 15, 20, 25, 30, 40, 50, 75, or 100 locations. In some embodiments, fewer components are used to reduce costs (e.g., not having an EDM 116, electronic tilt sensor, only one camera but two targets, and/or a rotational mechanism for measuring an angle). In some embodiments, more components are used, redundantly, to increase accuracy.

Figure 5A:
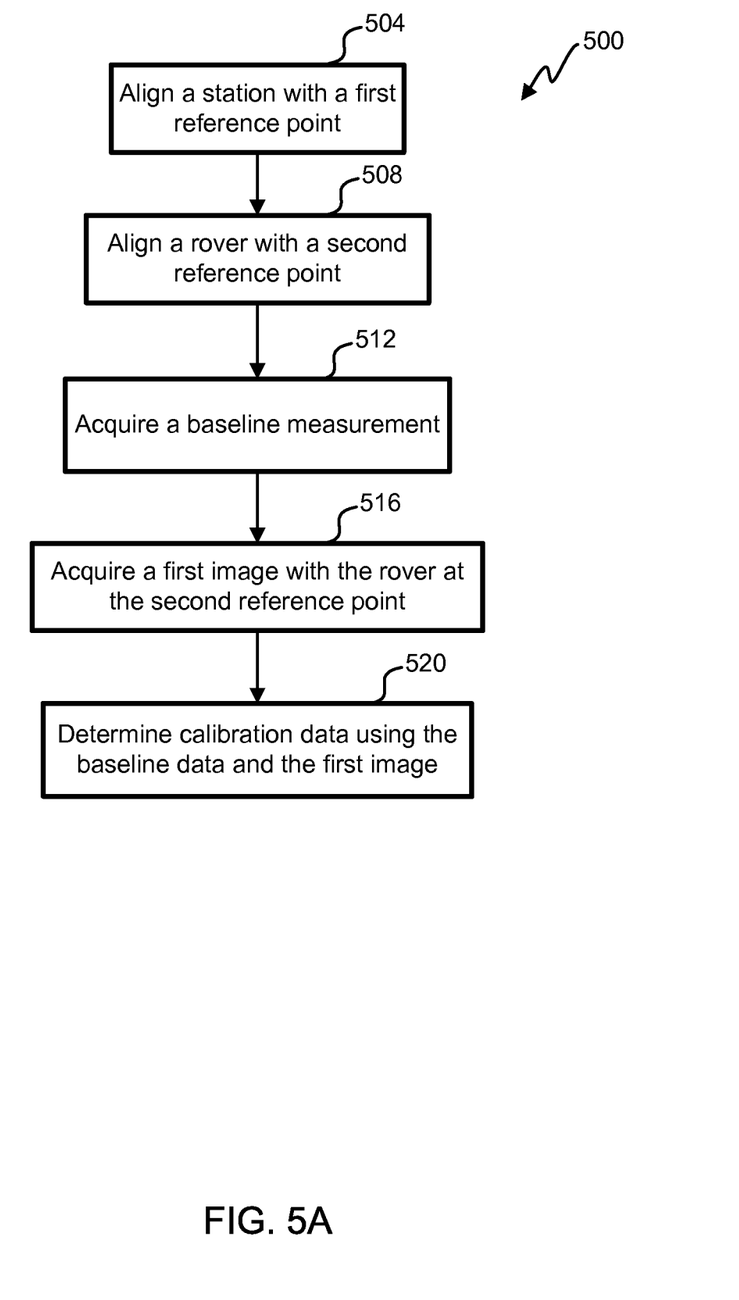
FIGS. 5A and 5B illustrate flowcharts of embodiments of processes for land surveying.
Figure 5B:
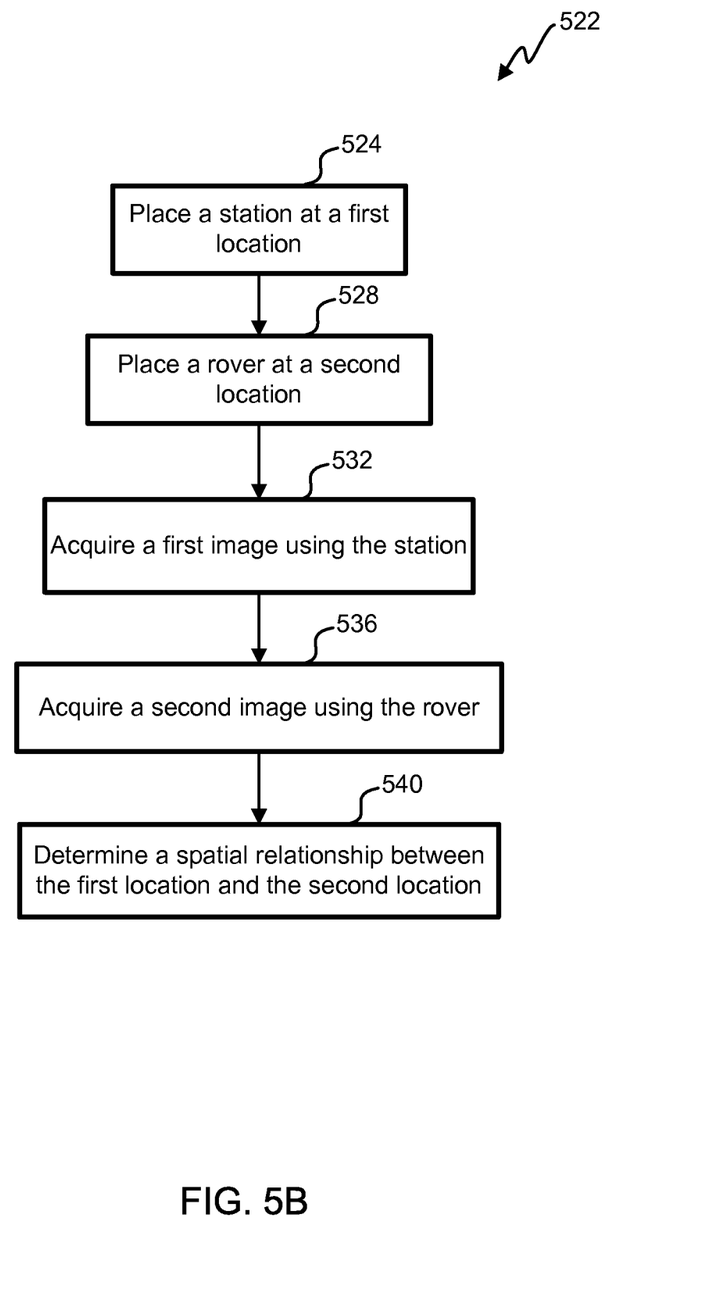

In FIGS. 5A and 5B flowcharts of embodiments of processes for land surveying are presented. In FIG. 5A, a flowchart of an embodiment of a process 500 for establishing calibration data is shown. Process 500 begins in step 504 where a station is aligned at a first reference point. In some embodiments, the station is aligned over the first reference point (e.g., over a geodetic marker using the plumb bob 102). In some embodiments the station is aligned with the first reference point by placing the station at a known or determinable distance and bearing away from the first reference point.

In step 508 a rover is aligned with a second reference point. In some embodiments, the second reference point is simply a location where the rover is placed. In step 512, a baseline measurement is acquired. For example, in some embodiments acquiring a baseline measurement is done by measuring a baseline distance between the first reference point and the second reference point using a tape measure. A compass is also used to obtain a baseline bearing between the first rover and the second rover. Baseline data can also include information such as known distances between cameras; known distances between targets; the baseline distance; and/or the baseline bearing.

In step 516 a first image is acquired with the station aligned with the first reference point and the rover aligned with the second reference point. The baseline image is acquired by a camera 112 that is on either the station or the rover. The baseline image includes an image of a target 104. Calibration data is determined by using the baseline data and the first image, step 520 (e.g., by correlating a location of the target 104 in the first image to the baseline data).

As an exemplification, two rovers (e.g., both similar to rover 350 in FIG. 3C) are used for surveying a job site. A first rover is used to move around a job site as a rover. A second rover is used as a station and aligned with a known mark on the job site. The distance between the first rover and the second rover, a baseline distance, is measured (e.g., with a tape measure). A camera 112 on the station (the second rover) acquires a baseline image (e.g., "takes a picture") of the first rover. The baseline image includes the first target 104-1 and the second target 104-2 on the first rover. In the baseline image, the first target 104-1 is located at first set of coordinates (e.g., X1, Y1), and the second target 104-2 is located at a second set of coordinates (e.g., X2, Y2). Calibration data is determined by calculating a baseline-image distance between the first target 104-1 and the second target 104-2, and correlating the baseline-image distance to the baseline data. In some embodiments, the first set of coordinates and the second set of coordinates also become part of the calibration data correlated to the baseline data.

Referring next to FIG. 5B, an embodiment of a process 522 for determining a spatial relationship between a first location and a second location is shown. Process 522 begins in step 524 by placing a station at a first location (e.g., the station aligned with the first reference point as described in step 504 in FIG. 5A). In step 528, a rover is paced at a second location. In some embodiments, the second location is different from the second reference point as described in step 508 of FIG. 5A. In step 532, a camera on the station acquires a first image of the rover, and/or a target on the rover, while the rover is at the second location. In some embodiments, the station has two cameras separated by a known distance for making photogrammetric measurements.

A camera on the rover acquires a second image, step 536. The second image is acquired by the rover while the rover is at the second location. The second image includes the station, and/or a target on the station. The first image and the second image are analyzed to determine a spatial relationship between the first location and the second location. In some embodiments, calibration data (e.g., from step 520 in FIG. 5A) is used in determining the spatial relationship between the first location and the second location. For example, the baseline image and the first image are taken with a stationary camera, and both the baseline image and the first image have the same field of view. The change in location in the field of view and the change in distance between targets provides information for calculating the spatial relationship. In some embodiments, the rover has two cameras separated by a known distance for making photogrammetric measurements. In some embodiments, the rover is then moved to additional locations, and images are acquired while the rover is at the additional locations. In some embodiments, the spatial relationship is determined in a three-dimensional Cartesian coordinate system. In some embodiments, the spatial relationship is determined in a cylindrical coordinate system.

Continuing the exemplification above, the second rover is moved from the second reference point to the second location. The camera 112 on the first rover acquires a first image of the second rover. The first image comprises the first target 104-1 at a third set of coordinates (e.g., X3, Y3) and the second target 104-2 at a fourth set of coordinates (e.g., X4, Y4). A first-image distance between the third set of coordinates and the fourth set of coordinates is calculated and compared to the baseline-image distance. If the first-image distance is less than the baseline-image distance, then a distance between the first location and the first rover is greater than the baseline distance, and is calculated (e.g., by also knowing a focal length of the camera lens).

The third set of coordinates (and/or the fourth set of coordinates) is used to determine a three dimensional relationship between the first location and the first known mark. For example, a difference in height between the first location and the baseline location is calculated by Y3-Y1 and taking into account the distance between the first location and the second location. Similarly, a horizontal difference between the first location and the baseline location is calculated by X3-X1 and taking into account the distance between the first location and the second location.

Though in some embodiments, only one camera is used to acquire images of two targets, or two cameras are used to acquire images of one target, in other embodiments, multiple cameras, and multiple targets are used.

Figure 6A:
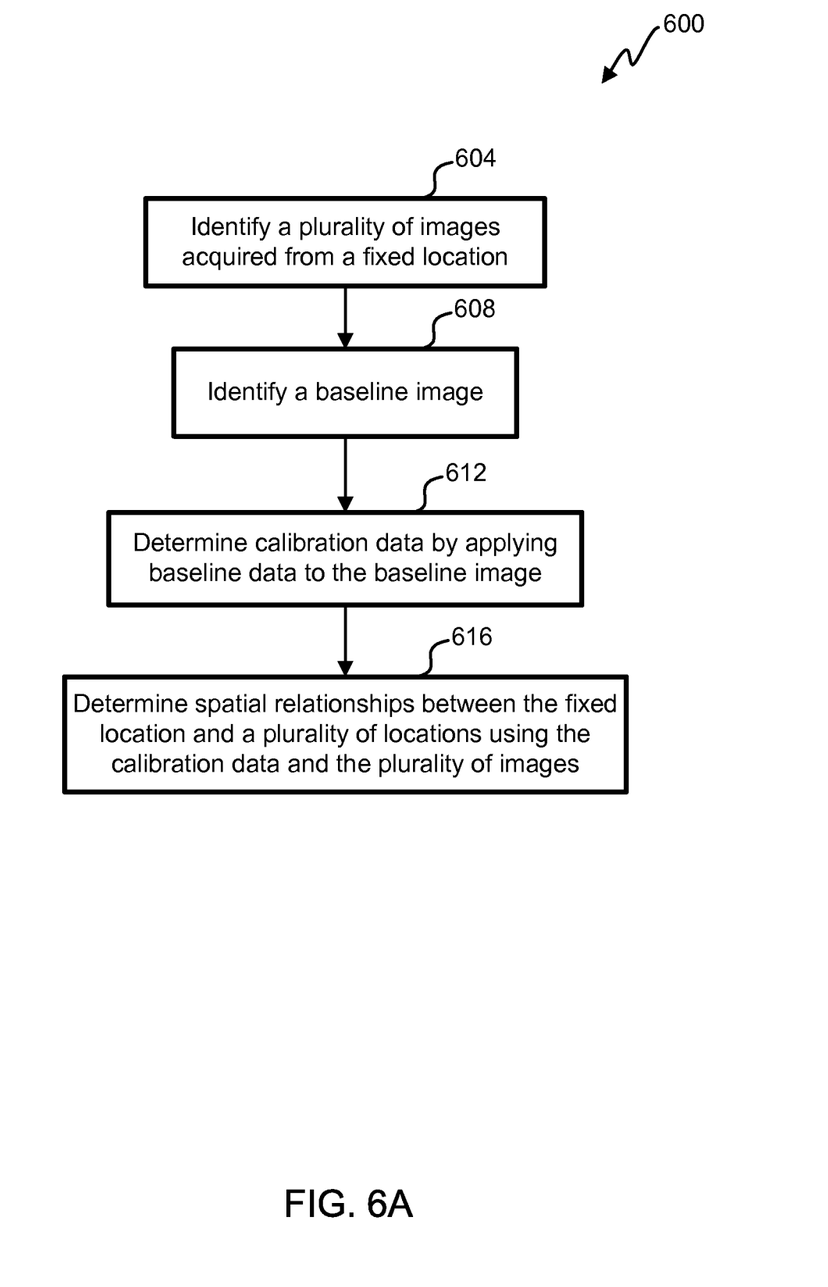
FIGS. 6A and 6B illustrate flowcharts of embodiments of processes for determining spatial relationships between a reference point and one or more target locations.

In FIG. 6A a flowchart of an embodiment of a process for determining a spatial relationship between a reference point and one or more target locations is shown. The process 600 for determining a spatial relationship begins in step 604 where a plurality of images are acquired from a fixed location. For example, a camera at a station is fixed at the first reference point while a rover is moved from the second reference point to a plurality of locations (e.g., a base/tripod holds a rover in FIG. 2, 3, or 4 acting as a station). The camera at the station takes pictures of the rover while the rover is at the second reference point and the plurality of locations. But the field of view of the camera at the station does not change (e.g., because the station is fixed).

In step 608, a baseline image is identified. For example, the baseline image is taken as described in step 516 of FIG. 5A. Further, in some embodiments, baseline data is also identified. For example, baseline data could include a measurement taken using a tape measure and entered by a user into a user interface; a measurement taken using an EDM 116 and electronically transmitted to a processing device; and/or a distance stored in a database. Additionally, baseline data can include a heading from the first location (i.e., a first reference point) to the second location (e.g., a compass on a smart phone, acting as the data collector, is used to acquire the heading; or the heading is entered into a user-interface field on the smart phone).

In step 612, calibration data is determined by applying baseline data to the baseline image. For example, in the baseline image, two targets are identified and pixels between the two targets are counted or calculated to determine a first image distance between targets. The first image distance between targets is correlated to the baseline data. In step 616 spatial relationships between the first reference point and the plurality of locations is determined by analyzing the plurality of images. For example, a second image distance between targets is calculated in a second image. By knowing a focal length of a lens of the camera, the first image distance between targets, the baseline data, and the second image distance between target, a distance between the first reference point and a second location can be calculated. In another example, coordinates of one or more targets in each image are determined and compared to coordinates of the one or more targets in the baseline image to determine a height difference between the first reference point and the second location, and to determine a heading between the first reference point and the second location.

Figure 6B:
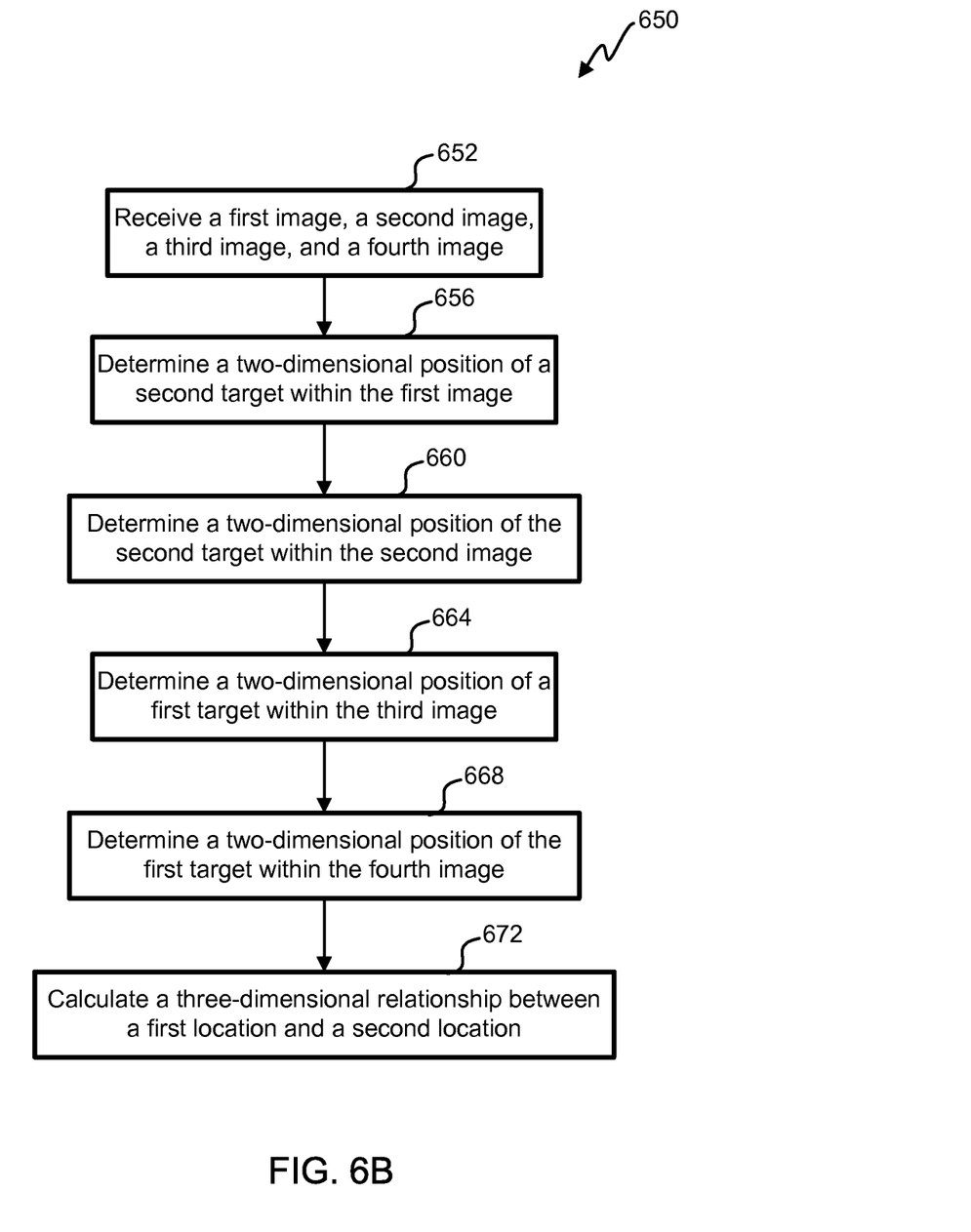

In FIG. 6B a flowchart of an embodiment of a process 650 for determining a spatial relationship between a first location and a second location is shown. In step 652 a first image, a second image, a third image, and a fourth image are received. A first camera and a second camera are part of a station. The station also comprises a first target (e.g., similar to the rover in FIG. 3B). The station further comprises a tripod to secure the station to keep the first camera and the second camera in fixed positions while the rover is moved to a plurality of locations. A third camera and a fourth camera are part of a rover. The rover also comprises a second target (e.g., also similar to the rover in FIG. 3B).

In some embodiments, the first image is taken by the first camera while the station is at the first location and the rover is at the second location. The second image is taken by the second camera while the station is at the first location and the rover is at the second location. The third image is taken by the third camera while the station is at the first location and the rover is at the second location. The fourth image is taken by the fourth camera while the station is at the first location and the rover is at the second location. In some embodiments, the first image and the second image are taken simultaneously; and the third image and the fourth image are taken simultaneously. The first image, second image, third image, and fourth image are transmitted (wired and/or wirelessly) to a computing device (e.g., a mobile, computing device such as a mobile phone) and the computing device receives the first image, the second image, the third image, and the fourth image.

The computing device determines a two-dimensional position (e.g., the position computed using a two-dimensional Cartesian coordinate system of the first image) of the second target 104-2 within the first image, step 656. The computing device determines a two-dimensional position of the second target 104-2 within the second image, step 660. The computing device determines a two-dimensional position of the first target 104-1 within the third image, step 664. The computing device determines a two-dimensional position of the first target 104-1 within the fourth image, step 668. The computing device then calculates a three-dimensional relationship between the first location and the second location based on two-dimensional positions of targets in images (e.g., applying baseline and/or calibration data). In some embodiments, the computing device calculates the three-dimensional relationship also based on a first known distance between the first camera and the second camera. In some embodiments, the computing device calculates the three-dimensional relationship also based on a second known distance between the third camera and the fourth camera.

In process 650 in FIG. 6B, four cameras and two targets are used. Though in some embodiments, only two cameras and one target, or two targets and one camera, are sufficient to determine a spatial relationship between the first location and the second location, having more cameras and/or targets are used for redundancy to improve accuracy. For example, the first image and the second image (two cameras, one target) are used to determine a first spatial relationship between the first location and the second location. The third image and the fourth image (two cameras, one target) are used to determine a second spatial relationship between the first location and the second location. The first spatial relationship and the second spatial relationship are averaged (e.g., arithmetic mean).

A number of variations and modifications of the disclosed embodiments can also be used. For example, more than two cameras 112 can be used on a station and/or a rover. And more than two targets can be used on a station and/or rover.

Figure 7:
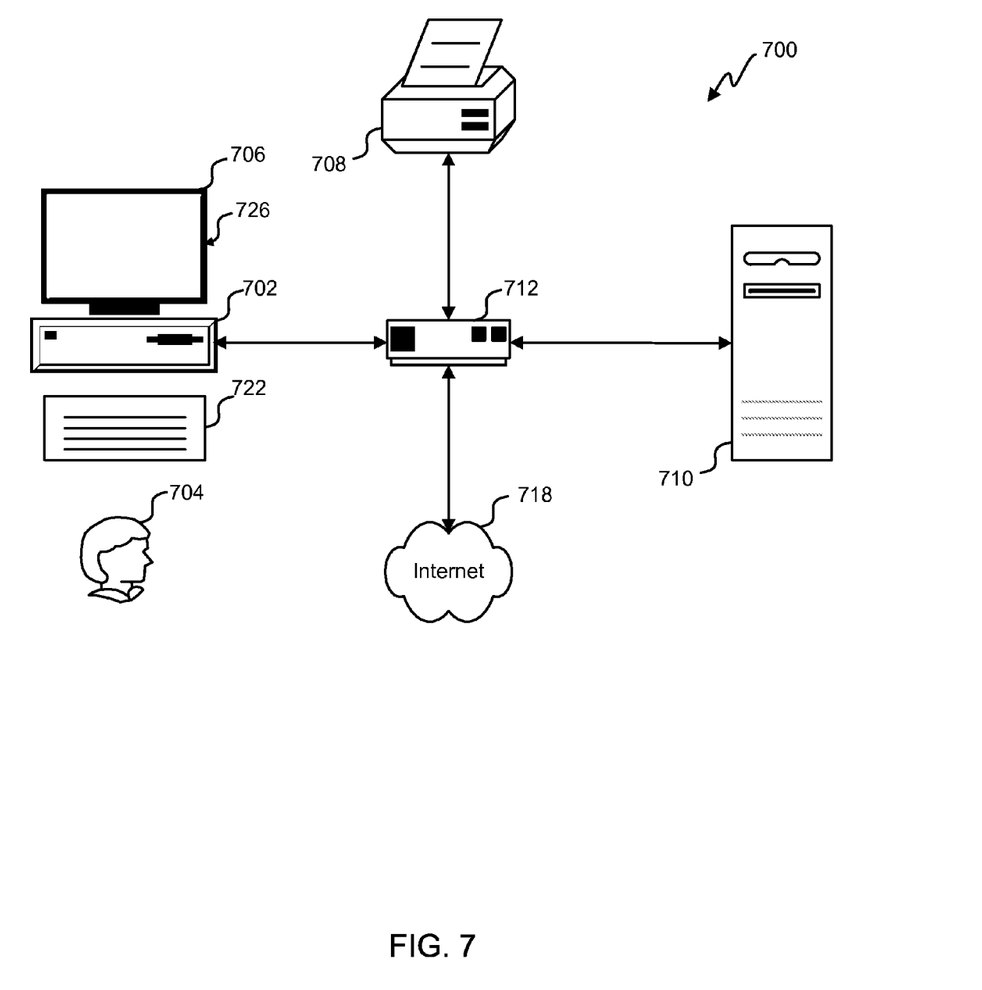
FIG. 7 depicts a block diagram of an embodiment of a computer system.

Referring next to FIG. 7, an exemplary environment with which embodiments may be implemented is shown with a computer system 700 that can be used by a designer 704 to design, for example, electronic designs. The computer system 700 can include a computer 702, keyboard 722, a network router 712, a printer 708, and a monitor 706. The monitor 706, processor 702 and keyboard 722 are part of a computer system, which can be a laptop computer, desktop computer, handheld computer, mainframe computer, etc. The monitor 706 can be a CRT, flat screen, etc.

A designer 704 can input commands into the computer 702 using various input devices, such as a mouse, keyboard 722, track ball, touch screen, etc. If the computer system 700 comprises a mainframe, a designer 704 can access the computer 702 using, for example, a terminal or terminal interface. Additionally, the computer 702 may be connected to a printer 708 and a server 710 using a network router 712, which may connect to the Internet 718 or a WAN.

The server 710 may, for example, be used to store additional software programs and data. In one embodiment, software implementing the systems and methods described herein can be stored on a storage medium in the server 710. Thus, the software can be run from the storage medium in the server 710. In another embodiment, software implementing the systems and methods described herein can be stored on a storage medium in the computer 702. Thus, the software can be run from the storage medium in the computer 702. Therefore, in this embodiment, the software can be used whether or not computer 702 is connected to network router 712. Printer 708 may be connected directly to computer 702, in which case, the computer system 700 can print whether or not it is connected to network router 712.

Figure 8:
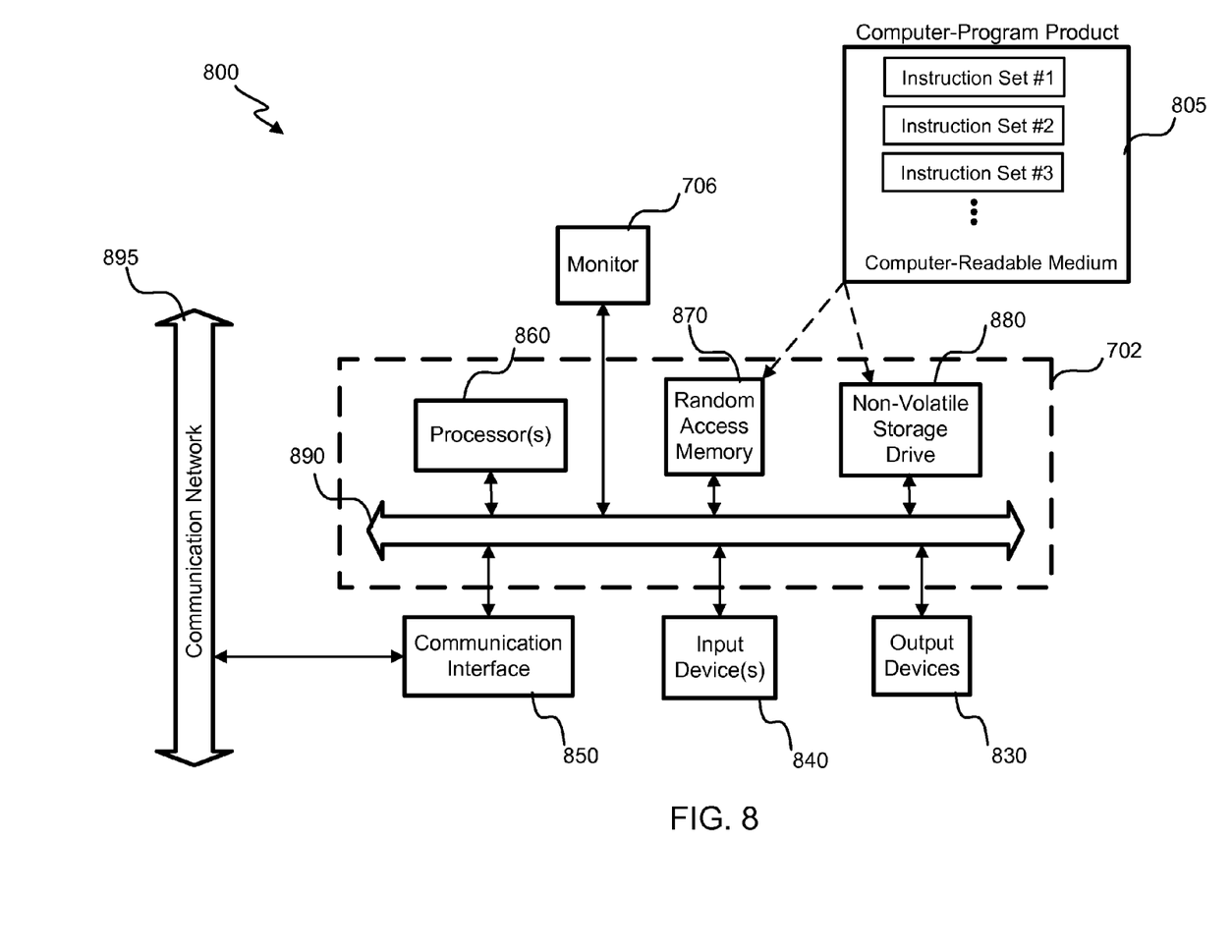
FIG. 8 depicts a block diagram of an embodiment of a special-purpose computer system.

With reference to FIG. 8, an embodiment of a special-purpose computer system 800 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system, it is transformed into the special-purpose computer system 800.

Special-purpose computer system 800 comprises a computer 702, a monitor 706 coupled to computer 702, one or more additional user output devices 830 (optional) coupled to computer 702, one or more user input devices 840 (e.g., keyboard, mouse, track ball, touch screen) coupled to computer 702, an optional communications interface 850 coupled to computer 702, a computer-program product 805 stored in a tangible computer-readable memory in computer 702. Computer-program product 805 directs system 800 to perform the above-described methods. Computer 702 may include one or more processors 860 that communicate with a number of peripheral devices via a bus subsystem 890. These peripheral devices may include user output device(s) 830, user input device(s) 840, communications interface 850, and a storage subsystem, such as random access memory (RAM) 870 and non-volatile storage drive 880 (e.g., disk drive, optical drive, solid state drive), which are forms of tangible computer-readable memory.

Computer-program product 805 may be stored in non-volatile storage drive 880 or another computer-readable medium accessible to computer 702 and loaded into memory 870. Each processor 860 may comprise a microprocessor, such as a microprocessor from Intel® or Advanced Micro Devices, Inc.®, or the like. To support computer-program product 805, the computer 702 runs an operating system that handles the communications of product 805 with the above-noted components, as well as the communications between the above-noted components in support of the computer-program product 805. Exemplary operating systems include Windows® or the like from Microsoft Corporation, Solaris® from Sun Microsystems, LINUX, UNIX, and the like.

User input devices 840 include all possible types of devices and mechanisms to input information to computer 702. These may include a keyboard, a keypad, a mouse, a scanner, a digital drawing pad, a touch screen incorporated into the display, audio input devices such as voice recognition systems, microphones, and other types of input devices. In various embodiments, user input devices 840 are typically embodied as a computer mouse, a trackball, a track pad, a joystick, wireless remote, a drawing tablet, a voice command system. User input devices 840 typically allow a user to select objects, icons, text and the like that appear on the monitor 706 via a command such as a click of a button or the like. User output devices 830 include all possible types of devices and mechanisms to output information from computer 702. These may include a display (e.g., monitor 706), printers, non-visual displays such as audio output devices, etc.

Communications interface 850 provides an interface to other communication networks and devices and may serve as an interface to receive data from and transmit data to other systems, WANs and/or the Internet 718. Embodiments of communications interface 850 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 850 may be coupled to a computer network, to a FireWire® bus, or the like. In other embodiments, communications interface 850 may be physically integrated on the motherboard of computer 702, and/or may be a software program, or the like.

RAM 870 and non-volatile storage drive 880 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 870 and non-volatile storage drive 880 may be configured to store the basic programming and data constructs that provide the functionality of various embodiments of the present invention, as described above.

Software instruction sets that provide the functionality of the present invention may be stored in RAM 870 and non-volatile storage drive 880. These instruction sets or code may be executed by the processor(s) 860. RAM 870 and non-volatile storage drive 880 may also provide a repository to store data and data structures used in accordance with the present invention. RAM 870 and non-volatile storage drive 880 may include a number of memories including a main random access memory (RAM) to store of instructions and data during program execution and a read-only memory (ROM) in which fixed instructions are stored. RAM 870 and non-volatile storage drive 880 may include a file storage subsystem providing persistent (non-volatile) storage of program and/or data files. RAM 870 and non-volatile storage drive 880 may also include removable storage systems, such as removable flash memory.

Bus subsystem 890 provides a mechanism to allow the various components and subsystems of computer 702 communicate with each other as intended. Although bus subsystem 890 is shown schematically as a single bus, alternative embodiments of the bus subsystem 890 may utilize multiple busses or communication paths within the computer 702.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that include or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A surveying system for making field measurements, the surveying system comprising:
    a station, wherein:
        the station is configured to be placed at a first location; and
        the station comprises:
            a first camera;
            a second camera at a first known distance from the first camera; and
            a first target;
    a rover, wherein:
        the rover is configured to be placed at a second location;
        the rover comprises:
            a third camera;
            a fourth camera at a second known distance from the third camera; and
            a second target; and
    a transmitter configured to wirelessly transmit images acquired by the first camera and the second camera to a receiving unit, wherein transmitting is configured to be performed while the station is placed at the first location.

2. The surveying system as recited in claim 1, further comprising a second transmitter, the second transmitter configured to wirelessly transmit images acquired by the third camera and the fourth camera to a second receiving unit.

3. The surveying system as recited in claim 2, wherein the second receiving unit is the same as the receiving unit.

4. The surveying system as recited in claim 1, further comprising the receiving unit, the receiving unit having one or more processors configured to execute instructions to:
    identify a first image, the first image being acquired by the first camera while the station is at the first location;
    determine a first position of the second target in the first image;
    identify a second image, the second image being acquired by the second camera while the station is at the first location;
    determine a second position of the second target in the second image;
    identify a third image, the third image being acquired by the third camera while the rover is at the second location;
    determine a first position of the first target in the third image;
    identify a fourth image, the fourth image being acquired by the fourth camera while the rover is at the second location; and
    determine a second position of the first target in the fourth image.

5. The surveying system as recited in claim 4, wherein the receiving unit is further configured to calculate a spatial relationship between the first location and the second location using the first position of the first target, the second position of the first target, the first position of the second target, the second position of the second target, the first known distance, and the second known distance.

6. The surveying system as recited in claim 4, wherein:
    the rover is configured to be moved to a plurality of locations; and
    the one or more processors are configured to:
        receive images acquired from the third camera and the fourth camera while the rover is at the plurality of locations; and
        determine spatial relationships between the first location and each of the plurality of locations.

7. The surveying system as recited in claim 1, wherein the station and the rover have a similar number of cameras and a similar number of targets.

8. The surveying system as recited in claim 1, wherein the first target is a painted marking on the station.

9. A method for making field measurements during surveying, the method comprising:
    placing a station at a first location, the station comprising:
        a first camera;
        a second camera at a first known distance from the first camera; and
        a first target;
    placing a rover at a second location, the rover comprising:
        a third camera;
        a fourth camera at a second known distance from the third camera; and
        a second target;
    acquiring a first image with the first camera while the rover is at the second location, the first image includes the second target;
    acquiring a second image with the second camera while the rover is at the second location, the second image includes the second target;
    acquiring a third image with the third camera while the rover is at the second location, the third image includes the first target;
    acquiring a fourth image with the fourth camera while the rover is at the second location, the fourth image includes the first target; and
    determining a spatial relationship between the first location and the second location based on:
        a position of the second target in the first image;
        a position of the second target in the second image;
        a position of the first target in the third image;
        a position of the first target in the fourth image;
        the first known distance; and
        the second known distance.

10. The method for making field measurements during surveying as recited in claim 9, wherein:
    the first target comprises a first pattern;
    the second target comprises a second pattern; and
    the method further comprises identifying a position of the first pattern in the third image and in the fourth image, and identifying a position of the second pattern in the first image and in the second image.

11. The method for making field measurements during surveying as recited in claim 9, wherein the second target comprises a light that blinks at a specified rate or a specified sequence.

12. The method for making field measurements during surveying as recited in claim 9, further comprising acquiring temperature data, wherein:

the temperature data is initially acquired within a predetermined time from when the first image and the second image were acquired;
the predetermined time is less than four hours; and
the temperature data is used to calculate the first known distance.

13. The method for making field measurements during surveying as recited in claim 9, further comprising:
placing the rover at a third location;
acquiring images of the first target and the second target while the rover is at the third location; and
determining a spatial relationship between the first location and the third location based on images acquired of the first target and the second target while the rover is at the third location.

14. The method for making field measurements during surveying as recited in claim 13, wherein:
positions of the first location and of the second location are determined independently from images taken by the first camera, the second camera, the third camera, or the fourth camera;
determining the spatial relationship between the first location and the second location includes establishing a baseline between the first location and the second location using coordinates of the first location and coordinates of the second location; and
determining the spatial relationship between the first location and the third location includes determining coordinates of the third location based on a location of the first target in images acquired while the rover is at the third location and the baseline between the first location and the second location.

15. The method for making field measurements during surveying as recited in claim 9, wherein the spatial relationship is a distance between the first location and the second location in a three-dimensional Cartesian coordinate system.

16. The method for making field measurements during surveying as recited in claim 9, further comprising transmitting an image from the station and/or from the rover to a mobile, computing device; wherein determining the spatial relationship between the first location and the second location is performed by the mobile, computing device.

17. The method for making field measurements during surveying as recited in claim 9, wherein the position of the second target in the first image is determined using a two-dimensional Cartesian coordinate system.

18. A memory device having instructions for determining a spatial relationship between a first location and a second location that when executed cause one or more processor to:
receive a first image, a second image, a third image, and a fourth image, wherein:
the first image is initially acquired at the first location using a first camera;
the second image is initially acquired at the first location using a second camera;
the third image is initially acquired at the second location using a third camera;
the fourth image is initially acquired at the second location using a fourth camera;
determine a two-dimensional position of a second target within the first image;
determine a two-dimensional position of the second target within the second image;
determine a two-dimensional position of a first target within the third image;
determine a two-dimensional position of the first target within the fourth image;
calculate a three-dimensional relationship between the first location and the second location based on:
the two-dimensional position of the second target within the first image;
the two-dimensional position of the second target within the second image;
the two-dimensional position of the first target within the third image;
the two-dimensional position of the first target within the fourth image;
a first known distance between the first camera and the second camera; and
a second known distance between the third camera and the fourth camera.

19. The memory device having instructions for determining the spatial relationship between the first location and the second location as recited in claim 18, wherein the memory device is located in a mobile, computing device.

20. The memory device having instructions for determining the spatial relationship between the first location and the second location as recited in claim 19, wherein the mobile, computing device is a mobile phone.

* * * * *